United States Patent
Broadley et al.

(10) Patent No.: US 10,075,571 B2
(45) Date of Patent: Sep. 11, 2018

(54) DUAL ANTENNA COMMUNICATIONS HEADSET

(71) Applicant: Sonetics Holdings, Inc., Portland, OR (US)

(72) Inventors: Simon Broadley, West Linn, OR (US); Brian VanderPloeg, Lake Oswego, OR (US)

(73) Assignee: Sonetics Holdings, Inc., Portland, OR (US)

( * ) Notice: Subject to any disclaimer, the term of this patent is extended or adjusted under 35 U.S.C. 154(b) by 0 days.

(21) Appl. No.: 15/045,003

(22) Filed: Feb. 16, 2016

(65) Prior Publication Data

US 2016/0165021 A1 Jun. 9, 2016

Related U.S. Application Data

(63) Continuation-in-part of application No. 14/322,069, filed on Jul. 2, 2014, and a continuation-in-part of application No. 14/967,284, filed on Dec. 12, 2015.

(51) Int. Cl.
*H04M 1/02* (2006.01)
*H04M 1/60* (2006.01)
*H04R 1/10* (2006.01)
*H04R 5/033* (2006.01)

(52) U.S. Cl.
CPC ....... *H04M 1/0258* (2013.01); *H04M 1/6058* (2013.01); *H04R 1/1091* (2013.01); *H04R 1/1008* (2013.01); *H04R 5/033* (2013.01); *H04R 2420/07* (2013.01)

(58) Field of Classification Search
CPC ...................................................... H01Q 1/12
USPC ................... 381/79, 309, 371; 343/718; 1/1
See application file for complete search history.

(56) References Cited

U.S. PATENT DOCUMENTS

| | | | | |
|---|---|---|---|---|
| 6,980,165 | B2* | 12/2005 | Yuasa | H01Q 1/273 343/718 |
| 9,608,577 | B2* | 3/2017 | Mostov | H03F 1/565 |
| 2008/0226094 | A1* | 9/2008 | Rutschman | H04M 1/6066 381/79 |
| 2012/0114154 | A1* | 5/2012 | Abrahamsson | H04R 5/033 381/309 |

* cited by examiner

*Primary Examiner* — Md S Elahee
(74) *Attorney, Agent, or Firm* — Keith L. Jenkins, Registered Patent Attorney, LLC; Keith L. Jenkins

(57) ABSTRACT

A communications headset having an antenna on each earpiece and having an RF switch for determining which antenna is receiving the superior signal and selecting that signal for amplification and distribution to headset speakers. A cable, supported and secured to a headband of the headset, connects the two earpieces for signal and power transfer. An illustrated embodiment has a transceiver and a speaker in an earpiece, with the RF switch, switching logic, and audio processor in one earpiece. Other configurations are within the scope of the invention. The RF switch selects the superior signal responsive to signal strength, signal to noise ratio, and/or similar figures of merit. Monitoring for signal superiority is at a high bandwidth to prevent granularity in the switching becoming noticeable to the user. The antenna corresponding to the superior signal is also used for transmitting from the headset.

20 Claims, 8 Drawing Sheets

DUAL ANTENNA COMMUNICATIONS HEADSET

CROSS REFERENCE TO RELATED APPLICATIONS

This application is a continuation in part of U.S. patent application Ser. No. 14/322,069 filed 2 Jul. 2014, by at least one common inventor, the entire disclosure of which is herein incorporated by reference. This application is also continuation in part of U.S. patent application Ser. No. 14/967,284 filed 12 Dec. 2015, by at least one common inventor, the entire disclosure of which is herein incorporated by reference

FIELD OF ART

The present invention relates to separate antennas for the two ear cups of communication headsets. More particularly, the invention relates to a system for determining the stronger signal reception as between the two antennas and selecting the stronger signal.

STATEMENT REGARDING FEDERALLY SPONSORED RESEARCH AND DEVELOPMENT

None.

BACKGROUND OF THE INVENTION

Headsets are widely used in industry for hearing protection, electronic communication, or both. A headset consists of one or two earpieces that cover the ear or ears of the user, and a headband that couples to the earpiece or earpieces to provide support for the ear piece or earpieces. An earpiece includes an ear cup that supports electronics, manual controls, access points, a ear cushion that surrounds the ear when in use, and one or more portions of couplings for headbands. With the advancement of communications technology, such as DECT 7 compliant technology, large numbers of people can be connected to a single communication headset network with subsets of users having particular communications relationship within their subset. In such a busy environment, a signal path to an antenna in such a communications headset may be temporarily blocked or interrupted by the movement of heavy equipment, vehicles, or even the position of the user himself.

Accordingly, there is a need for a headset that can improve the likelihood of receiving a signal, improving signal quality, and redundancy that can provide a better experience for users of complex communication headset networks.

SUMMARY OF THE INVENTION

The invention provides an antenna in each of the left and right ear pieces of a communications headset. An electronic audio cable, preferably a digital audio cable or RF coaxial cable, connects the left and right ear pieces. In one ear piece, the signals received from the left ear piece are compared with the signals received from the right earpiece, and the superior signal is selected. One signal may be judged superior on the basis of signal strength, signal to noise ratio, or other or combined criteria. The superior signal is selected as the RF inputs. The signal comparison and selection is continuous, and so can react quickly to highly dynamic environments. In a particular environment, the antenna path selected for receiving is also selected for sending.

In an embodiment, the invention provides: A dual antenna communications headset including: first and second ear pieces; first and second antennas in the first and second ear pieces, respectively; and an electronic signal cable in communication between the first and second ear pieces; an RF switch adapted to: receive first and second input signals from the first and second antennas, respectively; to compare the first and second input signals; to determine a superior signal as between the first and second input signals; and to communicate the superior signal to a transceiver; a control output from the transceiver to the RF switch, adapted to control the RF switch responsive to transceiver signal processing; an audio processor adapted to receive the superior signal; first and second audio speakers in the first and second ear pieces, respectively, where the audio processor is adapted to communicate a processed audio signal input to the first and second audio speakers; and where the processed audio signal is adapted to be communicated to one of the first and second audio speakers via the electronic signal cable. That dual antenna communications headset, including: one of the first antenna and the second antenna, determined to be receiving the superior signal, adapted to be selected for transmitting wireless communications from the headset; the electronic signal cable further including an RF coaxial cable; a headgear adapted to: connect and support the first and second ear pieces; and support and secure the electronic signal cable; and first and second ear cups within the first and second ear pieces, respectively, where the first and second ear cups are made of a plastic including substantial transparency at a communications frequency band of the transceiver.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

As used and defined herein, the term "headset" refers to a communications headset that consists of two ear pieces that cover the ears of the user, and a headband that couples to the earpieces to provide support for the earpieces. An earpiece is defined to include an ear cup that supports electronics, manual controls, access points, an ear cushion that surrounds the ear when in use, and one or more portions of couplings for headbands.

Figure 1:
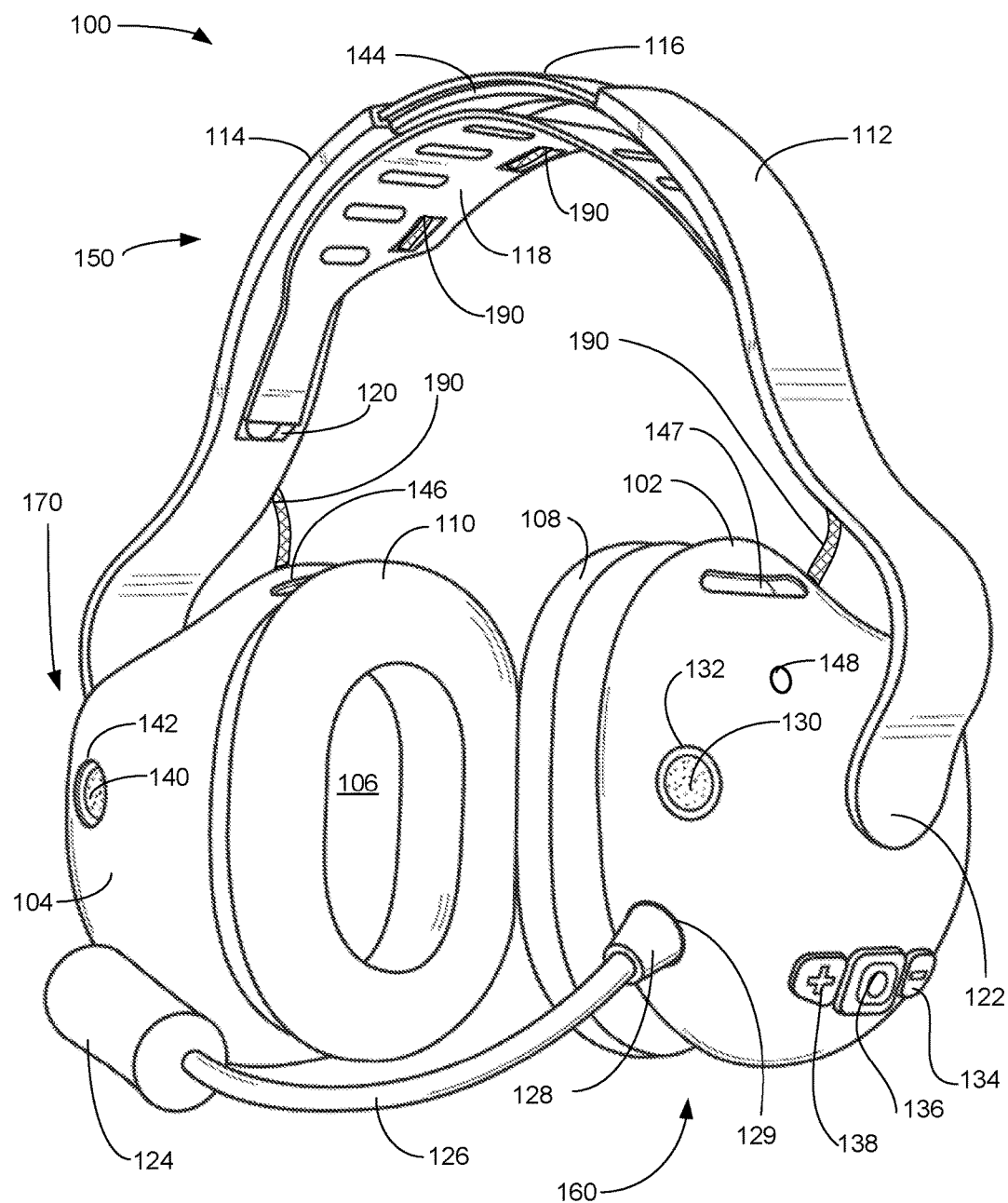
FIG. 1 is a perspective view illustrating an exemplary embodiment of a dual antenna cable installed on a headset in a first exemplary configuration, according to a preferred embodiment of the present invention.

FIG. 1 is a perspective view illustrating an exemplary embodiment of a dual antenna cable 190 installed on a headset 100 in a first exemplary configuration, according to a preferred embodiment of the present invention. The headset 100 includes headgear 150, left side communication earpiece 160, and right side communication earpiece 170. Each earpiece 160 and 170 includes a structural ear cup 106 that fits over the users ear (one visible in this view), a ear cushion 108 and 110, respectively extending from the open edge of each ear cup 106, and communications electronics and controls, about which more will be described below. Each earpiece 160 and 170 has, respectively, a ruggedizer 102 and 104 as described in pending U.S. patent application Ser. No. 14/967,284 filed 12 Dec. 2015. Each ruggedizer 102 and 104 comprises a flexible resilient cover for each ear cup 106. As earpiece 160 is not the same as earpiece 170, so ruggedizers 102 and 104, respectively, are not identical. Ruggedizers 102 and 104 share some features. Both are made of a flexible resilient material, preferably silicone rubber, shaped adaptively to an exterior surface of an ear cup 106, including conformal portions adapted to protrusions such as buttons and switches. Both ruggedizers 102 and 104 have openings for direct access to access points, such as a DC charging port 406, an LED 148, a strap slot 146 and 147, or a cup-mounted microphone 140 on the exterior surfaces of their respective ear cups 106. Both ruggedizers 102 and 104 have conformal portions that fit to cover manually activated controls on their respective earpieces 160 and 170 for manual access, through the flexible ruggedizer, to controls on the exterior surfaces of their respective ear cups 106. In a particular embodiment, ear piece 160 and 170 has an LED 148.

Dual antenna cable 190 extends through an opening in the left ear cup 106 and the ruggedizer 102 and is guided over cable support 144 to an opening in ruggedizer 104 and right ear cup 106. In a particular embodiment, ruggedizers 102 and 104 may be omitted. Dual antenna cable 190 carries electric power, received audio, and selected amplified audio between the ear pieces 160 and 170, as will be described in more detail below. Dual antenna cable 190 enables comparison of signals received at left and right earpieces 160 and 170 and selection of the superior signal 636 (See FIG. 6) for use. In a particular embodiment, dual antenna cable 190 is a radio frequency (RF) coaxial cable. In use, the user's head acts as a blocker or attenuator to the RF signal in both transmit and receive modes. In a particular embodiment, transmission from both side of the user's head go back to the base station antenna without the user's head blocking the output. The advantage is clearer communication regardless of the orientation to the user's head relative to a communication path to the base station.

Left ruggedizer 102 has a microphone opening 132 for forward-directed microphone 130 and has a boom opening 129 for the base 128 of a boom 126 for boom microphone 124. Left ruggedizer 102 also has a strap opening 147 for use with a head strap 802 (see FIG. 8), which strap is used when the headgear 150 is rotated backward, relative to the earpieces 160 and 170, to a position behind the user's head. Left ruggedizer 102 also has an LED opening 148 to provide visibility for a status indicator LED. Lastly, hidden in this view, left ruggedizer 102 has a headgear opening 1104 (see FIG. 11) for receiving a coupling between the headgear, at tip 122, and the ear cup 106. Left ruggedizer 102 has conformal portions 134, 136, and 138 covering controls that are manually operated by the user. For example, conformal portion 134 may cover a volume lowering control, conformal portion 136 may cover an answer/menu button, and conformal portion 138 may cover a volume raising button. All of the manually activated controls under conformal portions 134, 136, and 138 can be operated by pressing through the ruggedizer 102. The conformal portions 134, 136, and 138 recreate the tactile features of their respective controls for ease of use. Right ruggedizer 104 has an opening 142 for forward-directed microphone 140 and has a strap opening 146 similar to strap opening 147. It should be appreciated that the openings described are merely exemplary, and that more, fewer, or different openings 129, 132, 142, 146, 147, and 148 and/or more, fewer, or different conformal portions 134, 136, and 138 may be used in various additional embodiments.

Ruggedizers 102 and 104 provide the following advantages to headset 100: improved mechanical shock resistance, improved water resistance, improved dust resistance, improved visibility to others, visual sub net identification, flotation of the entire headset 100, and noise reduction.

Headgear 150 includes head band sections 112 and 114 coupled together by head band adjuster 116. Head band sections 112 and 114 support head protector 118 at couplings 120 and 220 (see FIG. 2). Cable support 144 is supported by head band portions 112 and 114. Head band portions 112 and 114 couple at tips 122 and 222 (see FIG. 2) to earpieces 160 and 170, respectively. In additional embodiments, ear cups 106 may have various shapes and ruggedizers 102 and 104 may be produced adaptive to such various shapes.

Figure 2:
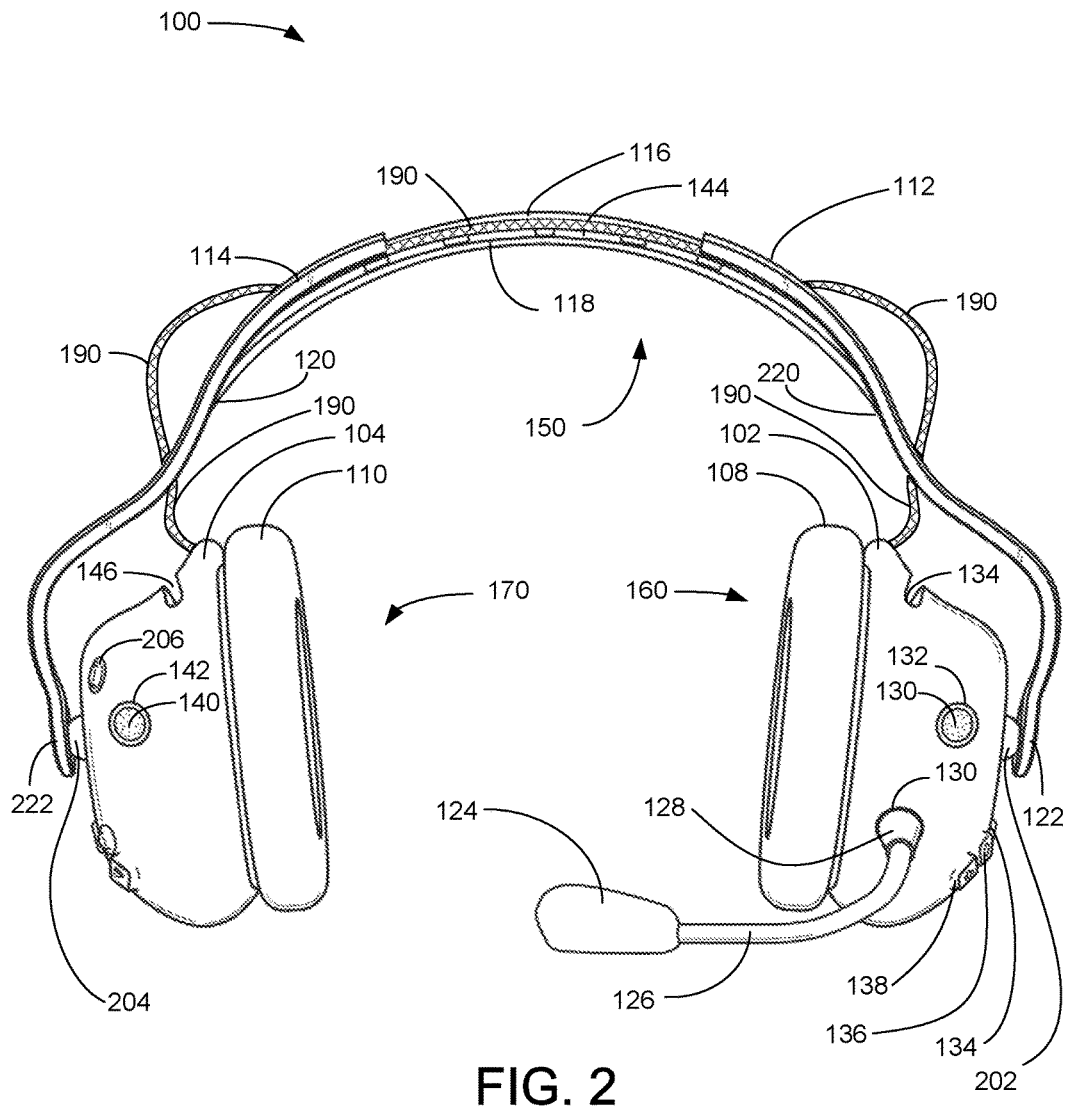
FIG. 2 is a front elevation view illustrating the exemplary embodiment of the dual antenna cable installed on a headset of FIG. 1, according to a preferred embodiment of the present invention.

FIG. 2 is a front elevation view illustrating the exemplary embodiment of the dual antenna cable 190 installed on a headset 100 of FIG. 1, according to a preferred embodiment of the present invention. Dual antenna cable 190 can be seen as having some slack between left ear piece 160 and the cable support 144 and between right ear piece 170 and the cable support 144, which allows for positional adjustability of the earpieces 160 and 170 without straining dual antenna cable 190. The slack is also useful when the headgear is rotated about ball portions 202 and 204 to be positioned behind the user's head.

Additional conformal portion 206 can be seen in this view, as well as ball portions 202 and 204 extending from head band sections 112 and 114, respectively, into sockets in earpieces 160 and 170, respectively. The headgear couplings using ball portions 202 and 204 are illustrated in the embodiment of FIG. 1 as being a ball and socket joint, but the invention is not so limited.

Figure 3:
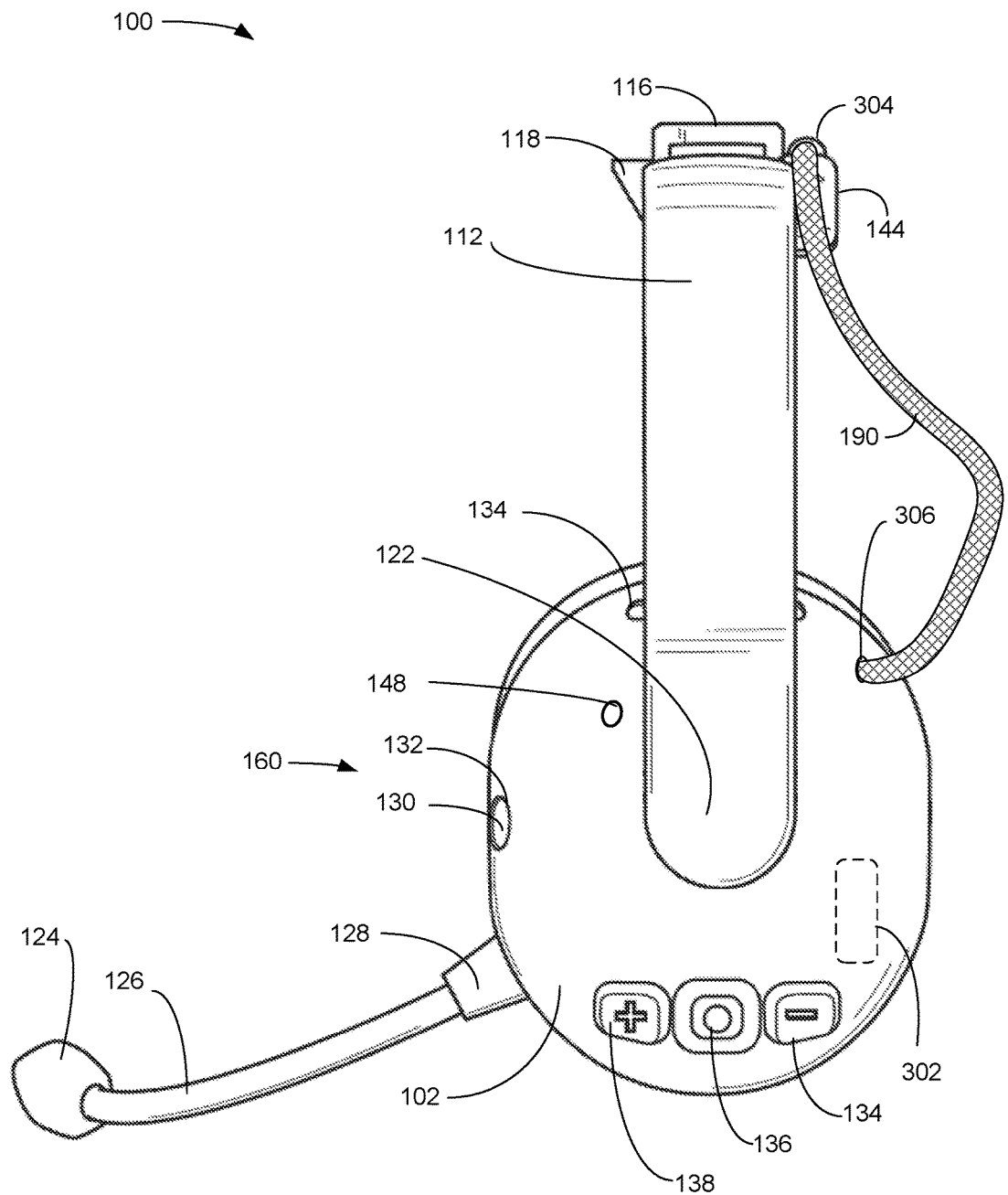
FIG. 3 is a left side elevation view illustrating an exemplary embodiment of the dual antenna cable installed on a headset of FIG. 1, according to a preferred embodiment of the present invention.

FIG. 3 is a left side elevation view illustrating an exemplary embodiment of the dual antenna cable 190 installed on a headset 100 of FIG. 1, according to a preferred embodiment of the present invention. Dual antenna cable 190 is secured to cable support 144 using one or more securers 304. Securers 304 may be, without limitation, ties, clamps, clips, and bands. Ruggedizer 102 has an opening 306 for access to an aligned opening in left ear cup 106 for receiving the dual antenna cable 190.

Groove 302 is a groove on the internal surface of the ruggedizer 102 that aligns to a two-way radio port opening on the external surface of the ear cup 106. Should the user desire to connect a two-way radio to the headset 100, the user can cut along groove 302 to gain access to the port. In other embodiments, other groves may be provided for other optional connections. In additional embodiments, various configurations of openings and conformal portions may adapt to corresponding configurations of access points and controls on the ear cup 106.

Figure 4:
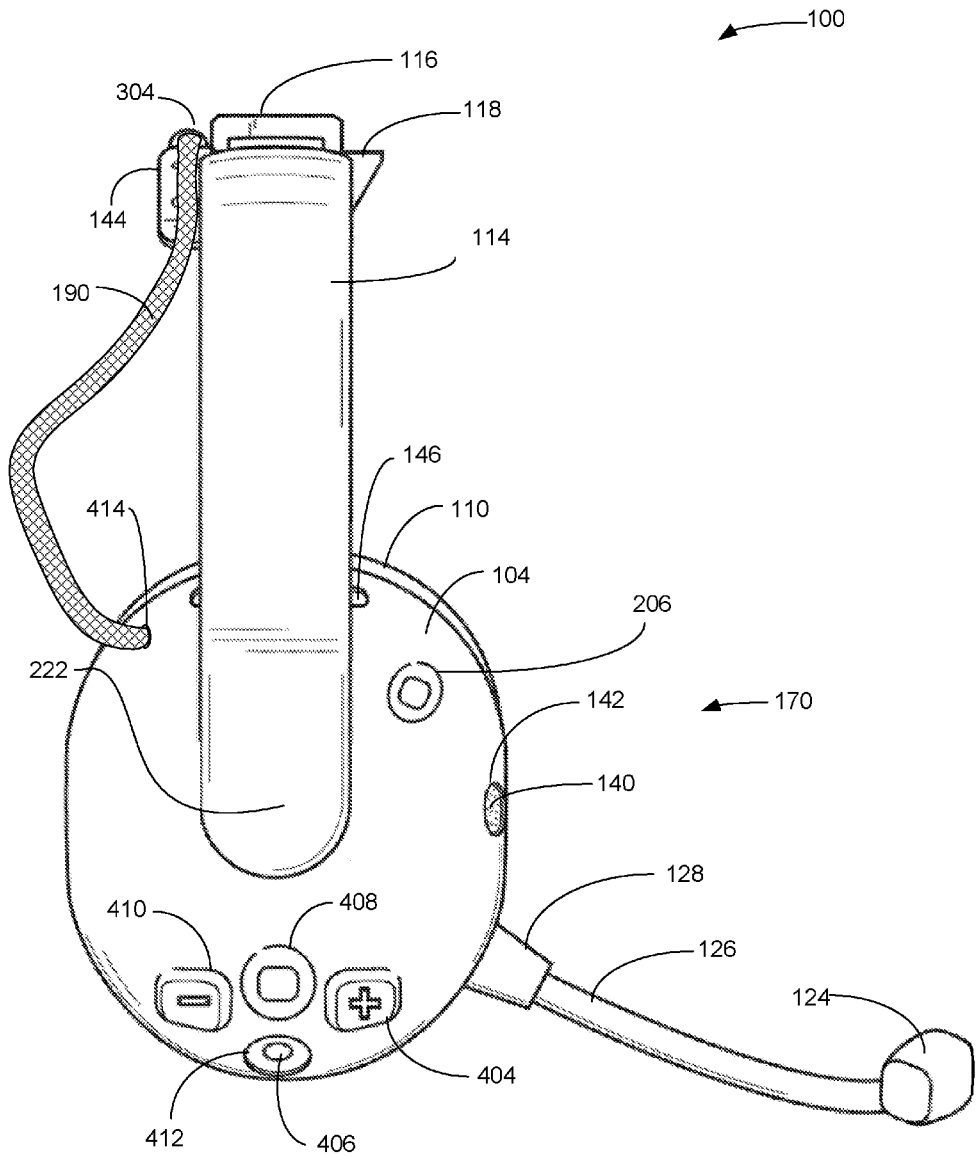
FIG. 4 is a right side elevation view illustrating the exemplary embodiment of the dual antenna cables installed on a headset of FIG. 1, according to a preferred embodiment of the present invention.

FIG. 4 is a right side elevation view illustrating the exemplary embodiment of the dual antenna cable 190 installed on a headset 100 of FIG. 1, according to a preferred embodiment of the present invention. Dual antenna cable 190 is secured to cable support 144 using one or more securers 304. Securers 304 may be, without limitation, ties, clamps, clips, and bands. Ruggedizer 104 has an opening 414 for access to an aligned opening in right ear cup 106 for receiving the dual antenna cable 190.

A power button conformal portion 206 of the ruggedizer 104 allows the user to manually actuate the power ON/OFF toggle button through the flexible and resilient ruggedizer 104. Power jack opening 412 in ruggedizer 104 enables access to DC power jack 406 for providing direct power and for recharging the internal battery. A push-to-talk (PTT) button conformal portion 408 of the ruggedizer 104 allows the user to manually actuate the PTT through the flexible and resilient ruggedizer 104. Down-channel selector switch conformal portion 410 of ruggedizer 104 allows the user to manually actuate the down-channel selector switch through the flexible and resilient ruggedizer 104. Up-channel selector switch conformal portion 404 of ruggedizer 104 allows the user to manually actuate the up-channel selector switch through the flexible and resilient ruggedizer 104. In additional embodiments, various configurations of openings and conformal portions may adapt to corresponding configurations of access points and controls on the ear cup 106.

Figure 5:
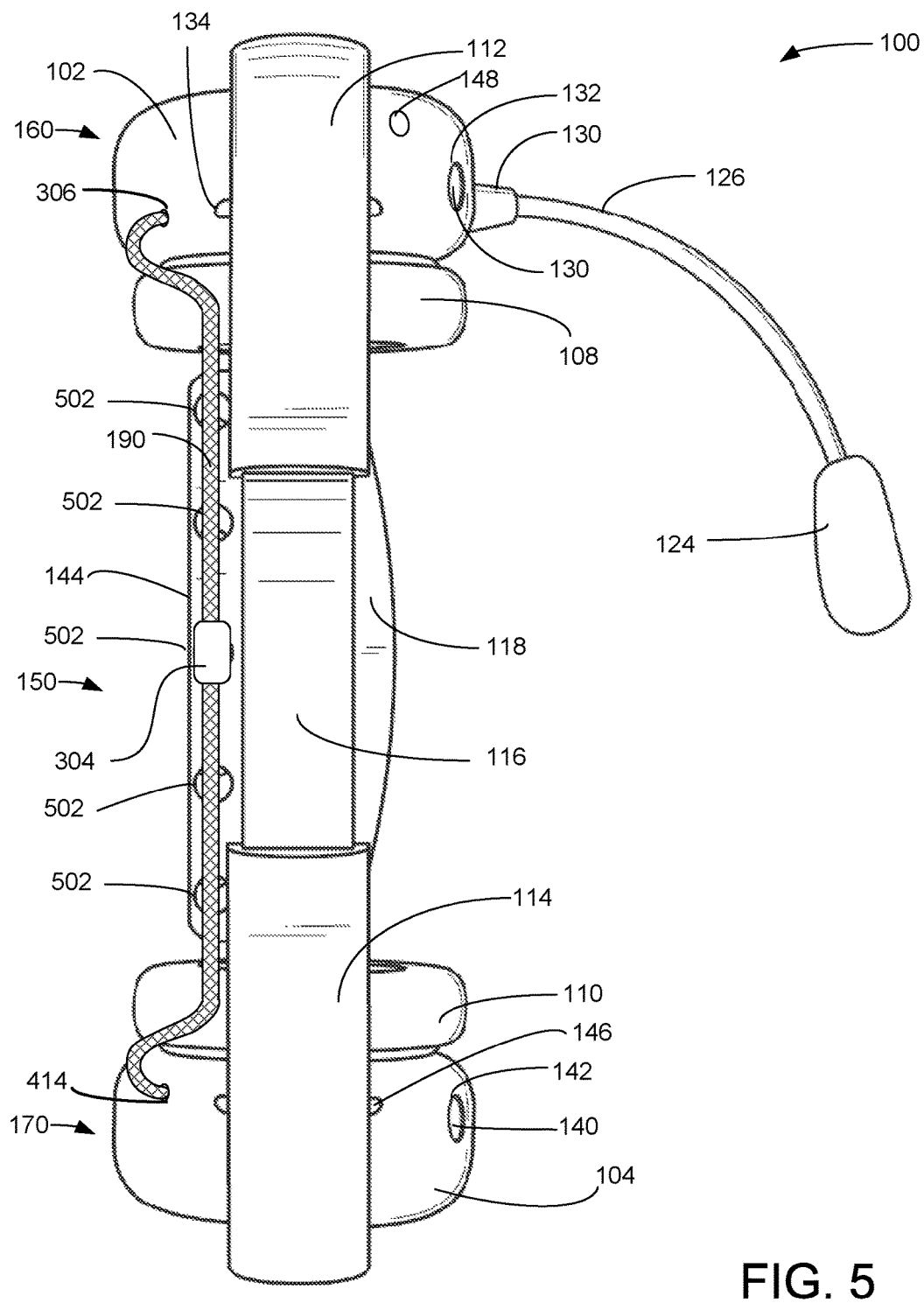
FIG. 5 is a top plan view illustrating the exemplary embodiment of the dual antenna cable installed on a headset of FIG. 1, according to a preferred embodiment of the present invention.

FIG. 5 is a top plan view illustrating the exemplary embodiment of dual antenna cable 190 installed on a headset 100 of FIG. 1, according to a preferred embodiment of the present invention. Cable threading bores 502 in cable support 144 enable a dual antenna cable 190 connection between earpieces 160 and 170. Securer 304 cooperates with a cable threading bore 502 to secure the dual antenna cable 190 to the cable support 144. In some embodiments, a plurality of securers 304, corresponding one-to-one with the plurality of cable threading bores 502, may be used.

In another embodiment, the dual antenna cable 190 may be threaded through an even number of cable threading bores 502 to maintain control of dual antenna cable 190 to move with headgear 150. In various other embodiments, more or fewer cable threading bores 502 may be used. In various additional embodiments, cable threading bores 502 may have various cross-sectional shapes.

Figure 6:
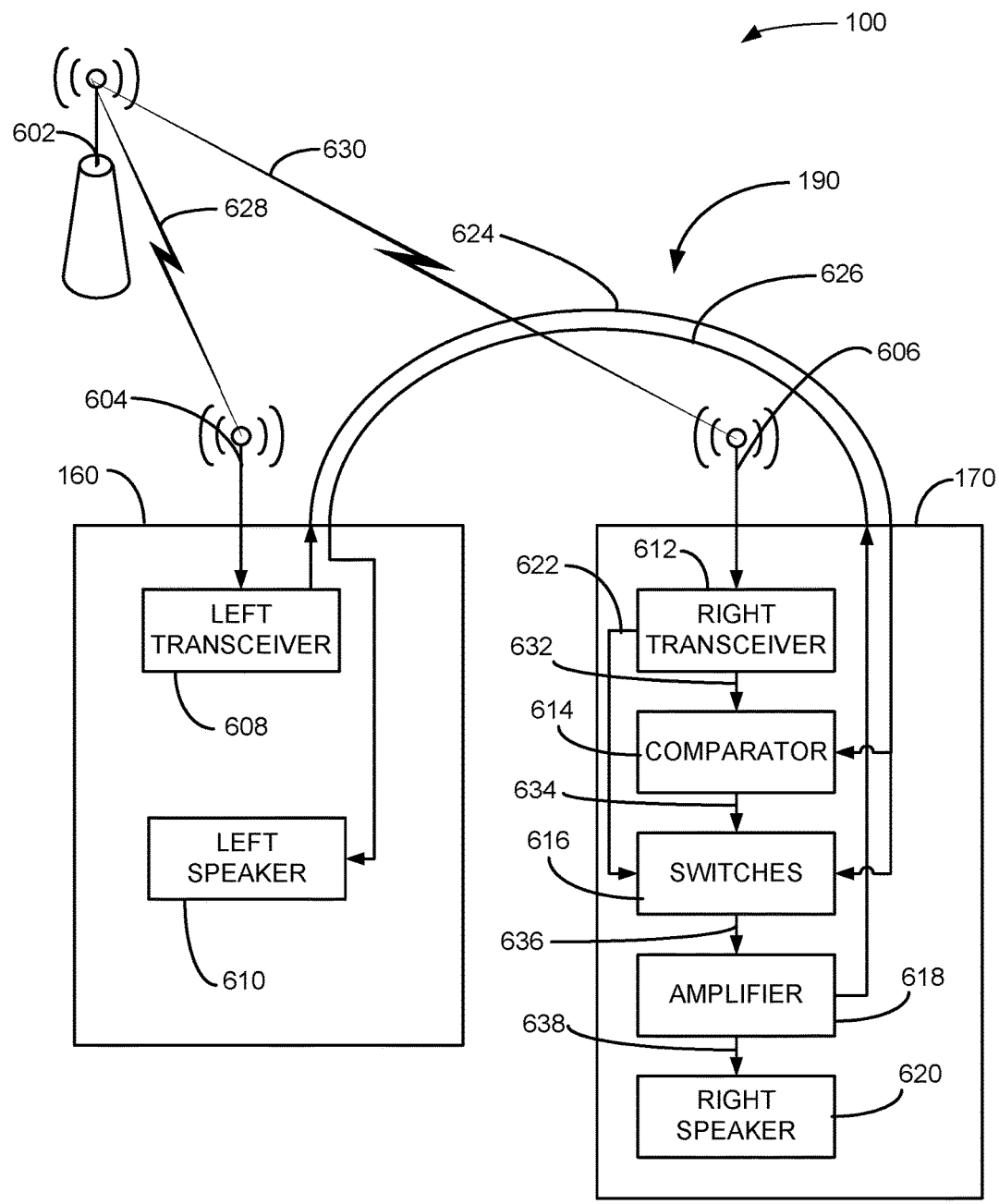
FIG. 6 is a diagrammatic view illustrating an exemplary embodiment of a dual antenna communications headset of FIG. 1, according to a preferred embodiment of the present invention.

FIG. 6 is a diagrammatic view illustrating an exemplary embodiment of a dual antenna communications headset 100 of FIG. 1, according to a preferred embodiment of the present invention. Remote transceiver antenna 602 communicates with left ear piece 160 via left earpiece antenna 604 over wireless signal link 628. Concurrently, remote transceiver antenna 602 communicates the same signal content with right ear piece 170 via right ear piece antenna 606 over wireless link 630. Left and right ear piece antennas 604 and 606 are illustrated as being outside of their respective earpieces 160 and 170 for simplicity of the drawing. In practice the left and right ear piece antennas 604 and 606 are inside their respective earpieces 160 and 170, in which the ear cups 106 are substantially transparent at the communication frequency band. Link 628 is shorter than link 630, and so may have a stronger signal and, therefore, be preferred. The user's head and/or headgear may block or interfere with the incoming link 628 or 630 giving the unblocked antenna 604 or 606, respectively, a better signal quality. Other factors may impact the selection of the superior signal 636, including, without limitation, signal to noise ratio, reflective pathways, electronic interference, and environmental factors. RF switch 616 is under the control of transceiver 612 via control line 622.

The received signal from link 628 at antenna 604 is conducted to left antenna coupling 608 that supplies the left antenna signal 624 to RF switch 614 via a line in dual antenna cable5 190. The received signal from link 630 at antenna 606 is conducted to right transceiver 612 that supplies the right antenna signal 632 to comparator 614 via line 632 in right ear piece 170. Comparator 614 determines which of the right and left antenna signals 632 and 624 is superior. A control input signal 634 switches RF switch 616 to send the superior signal 636 to audio processor 618. RF switch 616 is preferably implemented via an integrated circuit as switching logic, and may reside on the same integrated circuit as the comparator 614. Amplified superior signal 638 is supplied to the left speaker 610 via a line 626 in dual antenna cable 190 and to the right speaker 620 via direct line 638.

In a particular embodiment, the dual antenna functionality shown in ear pieces 160 and 170 may be interchanged. In another particular embodiment, the combined functionality shown in ear pieces 160 and 170 may reside in each ear piece 160 and 170 for redundancy.

Figure 7:
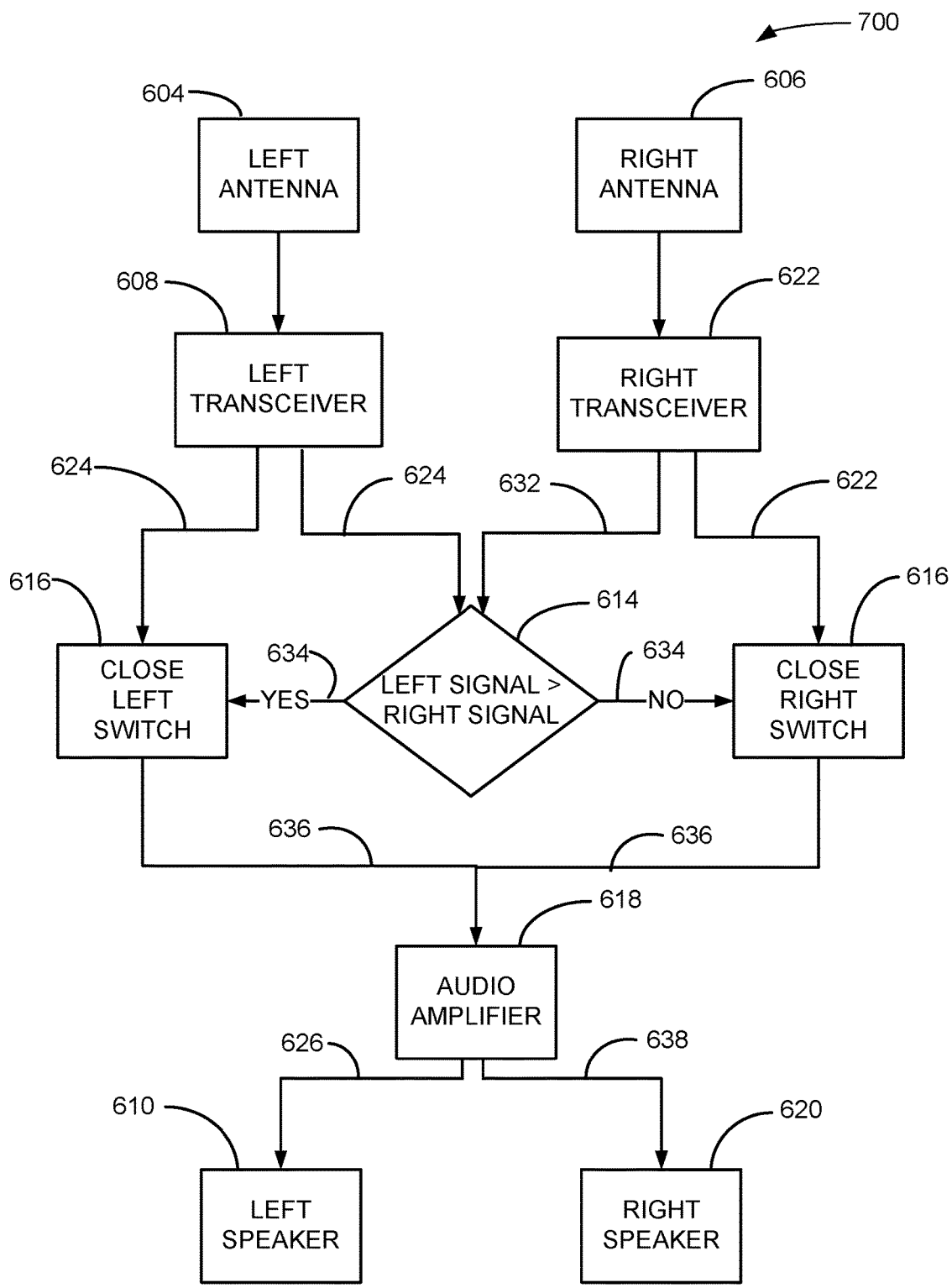
FIG. 7 is a diagram view illustrating an exemplary embodiment of the process of the dual antenna communications headset of FIG. 1, according to a preferred embodiment of the present invention.

FIG. 7 is a diagram view illustrating an exemplary embodiment of the process 700 of the dual antenna communications headset 100 of FIG. 1, according to a preferred embodiment of the present invention. Switches 702 and 706 are normally open switches that close, only one at a time, based on the outputs 708 and 710 of comparator 704, thereby supplying the selected superior signal to the audio processor 618, which may include an amplifier. Updating of the RF switch 614 output 636 happens at a small integer divisor (such a divisor of one) of the clock speed for the circuits, and in any case more than thirty times per second, such that the granularity of antenna selection changes is undetectable to the user. Those of skill in the art, enlightened by the present disclosure, will be aware of various ways to implement the functionality of process 700 in hardware, firmware, software, or combinations thereof, all of such ways are within the scope of the present invention.

Figure 8:
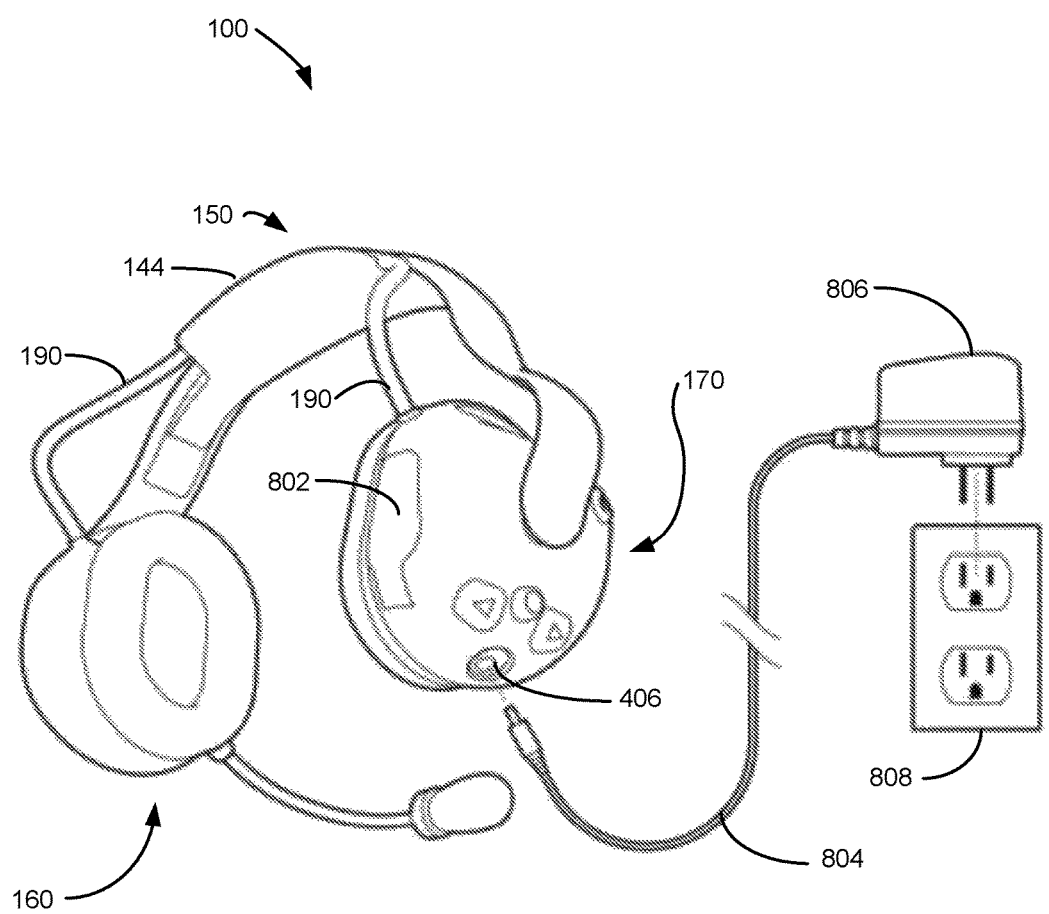
FIG. 8 is a perspective view illustrating an exemplary embodiment of the dual antenna communications headset of FIG. 1, according to a preferred embodiment of the present invention.

FIG. 8 is a perspective view illustrating an exemplary embodiment of the dual antenna communications headset 100 of FIG. 1, according to a preferred embodiment of the present invention. Dual antenna communications headset 100, illustrated without ruggedizers 102 and 104, includes battery compartment 802 for removing and installing a rechargeable commercial-off-the-shelf battery. The battery may be recharged from a power source, such as wall socket 808, via a transformer 806 and cable 804 connecting to the DC power jack 406. Various transformers 806 may be supplied, adapted to various power sources. In a particular embodiment, each earpiece may have a battery compartment

802 and a battery, with recharging access to DC charging port 406 for the left earpiece 160 via dual antenna cable 190.

The embodiments described above are merely exemplary. Such examples are limited only by the claims below in light of the specification above. Those of skill in the art, enlightened by the present disclosure, will understand the variety of ways that the dual antenna communications headset 100 may be implemented.

We claim:

1. A dual antenna communications headset comprising:
   a. first and second ear pieces;
   b. first and second antennas inside said first and second ear pieces, respectively; and
   c. a dual antenna cable in direct communication between said first earpiece and said second ear piece, wherein said dual antenna cable is operable to communicate:
      i. an RF audio signal received in said second earpiece to a circuit in said first earpiece; and
      ii. an amplified audio signal from said first earpiece to a speaker in said second earpiece.

2. The dual antenna communications headset of claim 1, comprising an RF switch adapted to:
   a. receive first and second input signals from said first and second antennas;
   b. compare said first and second input signals;
   c. determine a superior signal as between said first and second input signals; and
   d. output said superior signal.

3. The dual antenna communications headset of claim 2, comprising a control output from said transceiver to said RF switch, adapted to control said RF switch based on transceiver signal processing.

4. The dual antenna communications headset of claim 3, comprising an audio processor adapted to receive said superior signal.

5. The dual antenna communications headset of claim 4, comprising first and second audio speakers in said first and second ear pieces, respectively, wherein said audio processor is adapted to communicate a processed audio signal input to said first and second audio speakers.

6. The dual antenna communications headset of claim 5, wherein one of said first antenna and said second antenna, determined to be receiving said superior signal, is adapted to be selected for transmitting wireless communications from said headset.

7. The dual antenna communications headset of claim 6, wherein said processed audio signal is adapted to be communicated to one of said first and second audio speakers via said dual antenna cable.

8. The dual antenna communications headset of claim 1, wherein said dual antenna cable comprises an RF coaxial cable.

9. The dual antenna communications headset of claim 1, comprising a headgear adapted to:
   a. connect and support said first and second ear pieces; and
   b. support and secure said dual antenna cable.

10. The dual antenna communications headset of claim 1, comprising first and second ear cups within said first and second ear pieces, respectively, wherein said first and second ear cups are made of a plastic that is substantially transparent at a communications frequency band of said transceiver.

11. A dual antenna communications headset comprising:
    a. first and second ear pieces;
    b. first and second antennas inside said first and second ear pieces, respectively; and
    c. a dual antenna cable in direct communication between said first earpiece and said second ear piece, wherein said dual antenna cable is operable to communicate:
       i. an RF audio signal received in said second earpiece to a circuit in said first earpiece; and
       ii. an amplified audio signal from said first earpiece to a speaker in said second earpiece
    d. an RF switch adapted to:
       i. receive first and second input signals from said first and second antennas, respectively;
       ii. compare said first and second input signals;
       iii. determine a superior signal as between said first and second input signals; and
       iv. output said superior signal.

12. The dual antenna communications headset of claim 11, comprising:
    a. a control output from said transceiver to said RF switch, adapted to control said RF switch responsive to transceiver signal processing; and
    b. an audio processor adapted to receive said superior signal.

13. The dual antenna communications headset of claim 12, comprising first and second audio speakers in said first and second ear pieces, respectively, wherein said audio processor is adapted to communicate a processed audio signal input to said first and second audio speakers.

14. The dual antenna communications headset of claim 13, wherein said processed audio signal is adapted to be communicated to one of said first and second audio speakers via said dual antenna cable.

15. The dual antenna communications headset of claim 11, wherein one of said first antenna and said second antenna, determined to be receiving said superior signal, is adapted to be selected for transmitting wireless communications from said headset.

16. The dual antenna communications headset of claim 11, wherein said dual antenna cable comprises an RF coaxial cable.

17. The dual antenna communications headset of claim 11, comprising a headgear adapted to:
    a. connect and support said first and second ear pieces; and
    b. support and secure said dual antenna cable.

18. The dual antenna communications headset of claim 11, comprising first and second ear cups within said first and second ear pieces, respectively, wherein said first and second ear cups are made of a plastic that is substantially transparent at a communications frequency band of said transceiver.

19. A dual antenna communications headset comprising:
    a. first and second ear pieces;
    b. first and second antennas inside said first and second ear pieces, respectively; and
    c. a dual antenna cable in direct communication between said first earpiece and said second ear piece, wherein said dual antenna cable is operable to communicate:
       i. an RF audio signal received in said second earpiece to a circuit in said first earpiece; and
       ii. an amplified audio signal from said first earpiece to a speaker in said second earpiece,
    d. an RF switch adapted to:
       i. receive first and second input signals from said first and second antennas;
       ii. compare said first and second input signals;
       iii. determine a superior signal as between said first and second input signals; and
       iv. output said superior signal;

e. a control output from said transceiver to said RF switch, adapted to control said RF switch responsive to transceiver signal processing;
f. an audio processor adapted to receive said superior signal;
g. first and second audio speakers in said first and second ear pieces, respectively, wherein said audio processor is adapted to communicate a processed audio signal input to said first and second audio speakers; and
h. wherein said processed audio signal is adapted to be communicated to one of said first and second audio speakers via said dual antenna cable.

20. The dual antenna communications headset of claim 19, comprising:
a. one of said first antenna and said second antenna, determined to be receiving said superior signal, adapted to be selected for transmitting wireless communications from said headset;
b. said dual antenna cable further comprising an RF coaxial cable;
c. a headgear adapted to:
  i. connect and support said first and second ear pieces; and
  ii. support and secure said dual antenna cable; and
d. first and second ear cups within said first and second ear pieces, respectively, wherein said first and second ear cups are made of a plastic comprising substantial transparency at a communications frequency band of said transceiver.

* * * * *